United States Patent [19]
Field

[11] Patent Number: 4,979,853
[45] Date of Patent: Dec. 25, 1990

[54] CUTTING TOOL HOLDER FOR HIGH SPEED SPINDLE MACHINING SYSTEM

[75] Inventor: Nathaniel L. Field, Northville, Mich.

[73] Assignee: Ford Motor Company, Dearborn, Mich.

[21] Appl. No.: 470,459

[22] Filed: Jan. 26, 1990

[51] Int. Cl.⁵ .................. B23B 31/42; B23B 51/06
[52] U.S. Cl. .................. 409/136; 279/2 A; 269/48.1; 408/56; 408/59; 407/11; 409/234
[58] Field of Search .................. 279/2 A, 2 R, 4; 269/48.1; 408/56, 57, 59, 238, 239 R, 239 A; 409/136, 232, 234; 407/11

[56] References Cited

U.S. PATENT DOCUMENTS

| | | | |
|---|---|---|---|
| 2,971,765 | 2/1961 | Atherholt, Sr. | 279/4 |
| 4,317,577 | 3/1982 | Cameron | 279/2 A |
| 4,640,652 | 2/1987 | Rivera et al. | 409/136 |
| 4,677,792 | 7/1987 | Speidel | 51/168 |

Primary Examiner—Steven C. Bishop
Attorney, Agent, or Firm—Roger L. May; Joseph W. Malleck

[57] ABSTRACT

A fast tool change holder is provided for holding a tool adapter onto an internally delivered coolant spindle. The holder comprises an expandable split collet which can be inserted into the tool adapter and expanded in order to hold the adapter onto the spindle. The split collet has an expandable bladder therein which receives a coolant fluid from the spindle and expands under the pressure of the coolant fluid radially outwardly for expanding the split collet. The bladder enables the coolant fluid to assist mechanical and centrifugal forces associated with the split collet to hold the tool adapter onto the spindle.

24 Claims, 2 Drawing Sheets

CUTTING TOOL HOLDER FOR HIGH SPEED SPINDLE MACHINING SYSTEM

BACKGROUND OF THE INVENTION

The present invention generally relates to a fast tool change holder for holding a tool adapter onto a drive spindle and, more particularly, to a fast tool change holder for holding a tool adapter onto a high speed drive spindle by utilizing the pressure of the coolant fluid supplied from the drive spindle to a tool on the tool adapter.

Various types of arrangements are known to clamp a tool adapter onto a tool holder, and hence a drive spindle. One such arrangement comprises using a mechanical fastening means, such as a bolt, which extends from an outer end of the tool adapter, through a central opening in the tool adapter and into the tool change holder. The bolt threadedly engages within an opening in the tool change holder in order to clamp the tool adapter onto the tool change holder, and hence to the spindle. This clamping arrangement is inefficient and tedious since, in order to change tool adapters on the drive spindle, an operator must manually remove the bolt from the tool change holder, change the tool adapters and reinsert the bolt into the tool change holder.

A further known arrangement for clamping a tool onto a drive spindle comprises a tool adapter having a conical end portion which is capable of being received within a conical recess of a tool change holder. The tool change holder further includes a central opening connected with the recess for housing a piston therein. The piston has grippers at one end thereof for engaging a pin extending out from the conical end portion of the tool adapter. The piston is spring biased in a direction away from the tool adapter in order to exert a substantially constant inwardly directed pulling force upon the tool adapter.

As the piston is biased away from the tool adapter, the grippers are pulled within the recess of the tool change holder and contract towards one another as they move along a camming surface located within the recess. As a result, the gripPers are able to grasp the pin on the tool adapter and pull it inwardly into the recess. After pulling the tool adapter into the recess, the grippers further act to lock the adapter within the tool holder.

The tool adapter may be released from the tool change holder by means, such as a hydraulic ejector, which exerts a force upon the piston in a direction toward the tool adapter. This force acting upon the piston serves to overcome the spring force exerted upon the piston so that the grippers can open and release the tool adapter from the recess of the tool holder.

This clamping arrangement is also inefficient and tedious since, in order to change tool adapters on the spindle, an operator must first actuate the hydraulic ejector to release the grippers from the first tool adapter, change the tool adapters and subsequently engage the grippers with the second tool adapter. Further, this clamping system is disadvantageous because it requires a plurality of mechanical and hydraulic parts located within the tool holder for clamping the tool adapter therein. Such parts create added expense to the price of the tool holder and are problematic to maintain.

U.S. Pat. No. 4,677,792 discloses an arrangement for holding a bushing having a grinding wheel connected thereto onto a coupling element connected to a drive spindle. The coupling element is formed as a hydraulic expansion element which includes a thin-walled cylindrical expansion sleeve on an outer portion thereof and a bore centrally located therein. Oil is filled within the bore and the expansion sleeve. The oil within the expansion sleeve and the bore is capable of being compressed by a piston which slides within the bore. A bolt, which is screwed into a threaded extension of the bore, engages with the piston to move the same within the bore in order to compress the oil in the bore and the expansion sleeve. By compressing the oil within the bore and the expansion sleeve, the latter will expand radially outwardly and clamp the bushing onto the coupling element.

This system is also inefficient and tedious because an operator must manually perform numerous steps in order to change bushings on the coupling element. First, an operator must release the frictional grip between the expansion sleeve and the first bushing. This is done by engaging the bolt within the bore with a tool to decompress the oil within the expansion sleeve. The operator must then change the bushings on the coupling element and subsequently reinsert the tool to re-engage the bolt in order to compress the oil within the expansion sleeve to secure the second bushing onto the coupling element. Accordingly, there is a need for an improved fast tool change holder whereby an operator may quickly and efficiently change tool adapters on a drive spindle.

SUMMARY OF THE INVENTION

This need is met by the present invention which permits an operator to quickly and efficiently change tool adapters on a drive spindle. The present invention comprises a fast tool change holder for holding a tool adapter onto an internally delivered coolant spindle. The holder comprises an expandable split collet which can be inserted into a tool adapter and expanded in order to hold the adapter onto the spindle. The split collet has a rubber bladder therein which receives a coolant fluid from the spindle and expands under the pressure of the coolant fluid radially outwardly for expanding the split collet. The bladder enables the coolant fluid to assist mechanical and centrifugal forces associated with the split collet to hold the tool adapter onto the spindle.

In accordance with one aspect of the present invention, an improved fast tool change holder for holding a tool adapter onto a drive spindle by utilizing coolant fluid supplied from the drive spindle to a tool on the tool adapter is provided and includes: an expandable collet means connected to the drive spindle for holding the tool adapter onto the drive spindle after being inserted and expanded within the tool adapter. The fast tool change holder further includes means associated with the collet means for expanding the collet means radially outwardly utilizing the pressure of the coolant fluid supplied from the spindle to the tool on the tool adapter. The expanding means permits the coolant fluid to assist mechanical and centrifugal forces associated with the collet means to hold the tool adapter onto the spindle.

The expanding means may comprise a resilient bladder made from a polymeric material, such as natural or synthetic rubber. The expandable collet means may comprise a split collet. The expandable collet means may also include means, such as a protruding ring, extending outwardly from the collet means for engaging an indentation located within the tool adapter for retaining the adapter onto the spindle.

The tool adapter includes a first inner recess for receiving the expandable collet means therein and a second inner recess for delivering the coolant fluid supplied from the drive spindle to the tool on the tool adapter. The coolant fluid travels from the drive spindle, through the bladder and into the second inner recess for delivery to the tool. The bladder extends beyond the expandable collet means for creating a seal at the interface between the collet means and the tool adapter. This seal serves to prevent the coolant fluid from being diverted into the first inner recess of the tool adapter as the coolant fluid travels through the bladder and into the second recess.

The fast tool change holder may further comprise means for sensing when the expandable collet means is located within the tool adapter. The tool adapter may include means for permitting debris contained within the tool adapter to escape from the adapter. The fast tool change holder may further comprise means for attaching the expandable collet means to the spindle. Alternatively, the expandable collet means may be formed as an integral part of the spindle.

In accordance with a further aspect of the present invention, a clamping system for clamping a tool adapter onto a spindle is provided and includes: an expandable collet means connected to the spindle for holding the tool adapter onto the spindle after being inserted and expanded within the tool adapter. The clamping system further includes means located within the collet means for expanding the collet means radially outwardly utilizing the pressure of coolant fluid supplied from the spindle. The expanding means permits the coolant fluid to assist mechanical and centrifugal forces associated with the collet means to hold the tool adapter onto the spindle.

The means for expanding the collet means may comprise a resilient bladder made from a polymeric material, such as natural or synthetic rubber. The expandable collet means may comprise a split collet. The expandable collet means may also include retaining means, such as a protruding ring extending from the collet means, for engaging an indentation located within the tool adapter for retaining the tool adapter on the spindle.

The tool adapter includes a first inner recess for receiving the expandable collet means therein and a second inner recess for delivering the coolant fluid supplied from the drive spindle to the tool on the tool adapter. The coolant fluid travels from the drive spindle, through the bladder and into the second inner recess for delivery to the tool. The bladder extends beyond the expandable collet means for creating a seal at the interface between the collet means and the tool adapter. This seal serves to prevent the coolant fluid from being diverted into the first inner recess of the tool adapter as the coolant fluid travels through the bladder and into the second recess.

The clamping system may further comprise means for sensing when the expandable collet means is located within the tool adapter. The tool adapter may include means for permitting debris contained within the tool adapter to escape therefrom. The clamping system may further comprise means for attaching the expandable collet means to the spindle. Alternatively, the expandable collet means may be formed as an integral part of the spindle.

Accordingly, it is an object of the present invention to provide an improved tool holder and clamping system for clamping a tool adapter which will permit an operator to quickly and efficiently change tool adapters on a drive spindle. This and other objects and advantages will be apparent from the following description, the accompanying drawings and the appended claims.

DETAILED DESCRIPTION OF THE PREFERRED EMBODIMENT

Figure 1:
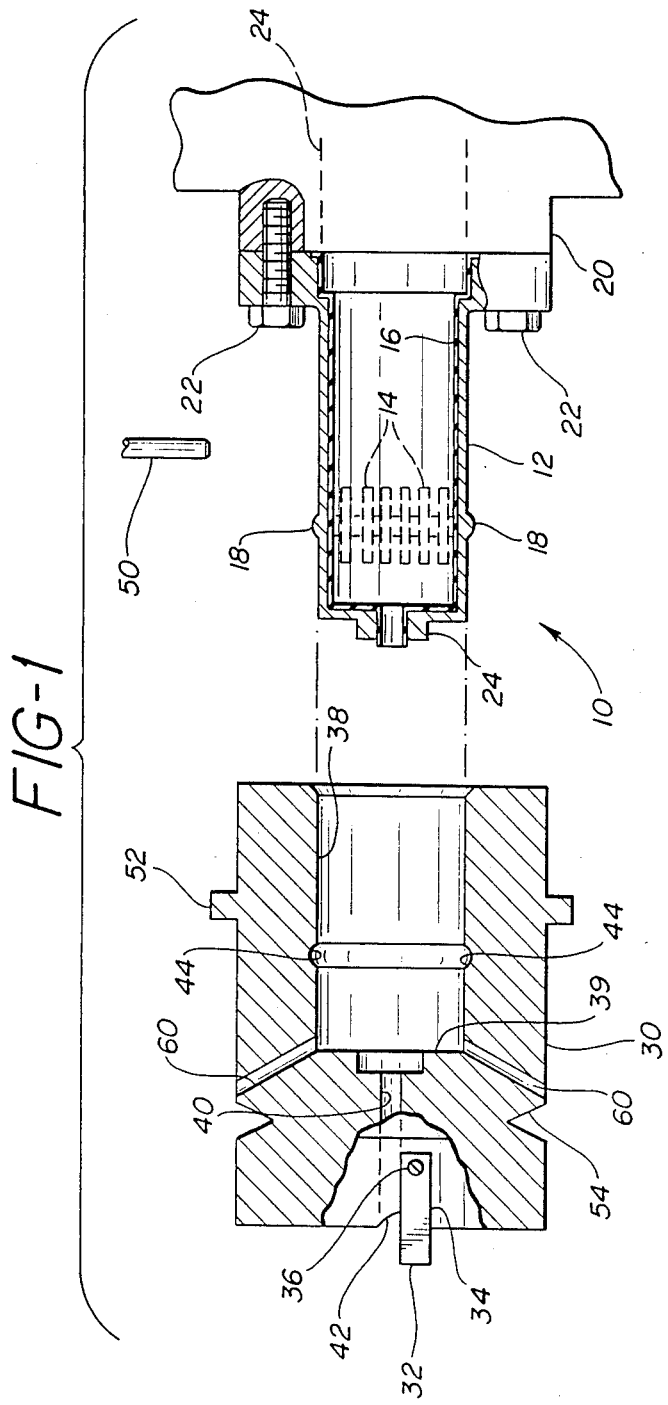
FIG. 1 is a side view, partially in section, of an unattached tool adapter and the tool holder of the present invention connected to a drive spindle.

The fast tool change holder of the present invention, generally designated by the reference numeral 10, is shown in FIG. 1 attached to a rotatable drive spindle 20 of a machining apparatus (not further shown). The tool holder 10 may be connected to the spindle 20 by fastening means, such as bolts 22 which threadedly engage within openings in the spindle 20. While not shown in the drawings, the tool holder 10 may alternatively be formed as an integral part of the spindle 20.

The fast tool change holder 10 serves to secure a tool adapter 30 onto the drive spindle 20. The tool adapter 30 may comprise any conventional tool adapter which suPplies a coolant fluid to a tool connected thereto. The tool attached to the tool adapter may comprise, for example, a drilling, reaming, milling, boring or grinding tool. For purposes of illustration only, a conventional tool adapter 30 is shown and has attached thereto a cutting insert 32, which may be used for boring. The cutting insert 32 is located within an outer recess 34 in the tool adapter 30 and is held therein by fastening means, such as a bolt 36.

Figure 3:
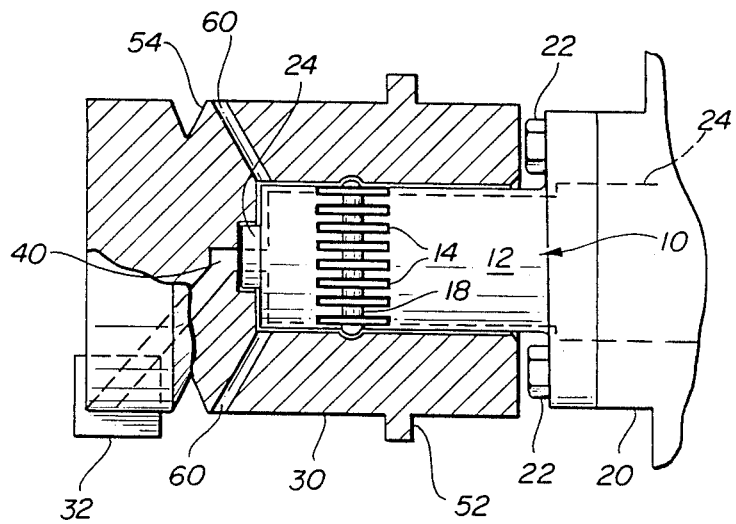
FIG. 3 is a top plan view, partially in section, of the tool holder of FIG. 1 with the tool adapter attached thereto.

Extending into the tool adapter 30 is a centrally located, generally cylindrical first recess 38 of a first diameter. The first recess 38 serves to receive the fast tool change holder 10 therein in order that the tool adapter 30 may be secured to the tool change holder 10, and hence to the spindle 20. The tool adapter 30 further includes a second recess 40, having a diameter smaller than that of the first recess 38. As best shown in FIG. 3, the second recess 40 extends from the first recess 38 to an opening 42 in the outer surface of the tool adapter 30. As will be discussed in more detail below, the second recess 40 serves as a conduit for coolant fluid delivered from the spindle 20 to the cutting insert 32.

Located within the first recess 38 is an indentation 44 which may span about the entire inner circumference of the first recess 38. As will be discussed further below, the indentation serves to receive therein a portion of the tool holder 10 to at least initially secure the tool adapter 30 onto the tool change holder 10.

The tool change holder 10 comprises an expandable split collet 12 having on its outer surface a protruding ring 18. The ring 18 preferably spans around the entire outer surface of the split collet 12. When the tool adapter 30 is engaged with the tool holder 10, the protruding ring 18 serves to at least initially lock the tool adapter 30 onto the tool holder 10 by engaging with the indentation 44 located in the tool adapter 30.

The split collet 12 also includes a plurality of slits or openings 14 therein which are spaced about the split collet 12. Located within the split collet 12 is a resilient bladder 16 which is preferably made from a polymeric material, such as natural or synthetic rubber. The resilient bladder 16, when expanded outwardly in a radial direction, serves to expand the split collet 12 in a radial direction, thereby frictionally locking the tool adapter 30 onto the split collet 12. The portion of the split collet 12 adjacent to and between the slits 14 will expand to a greater degree than the remaining portion of the split collet 12. Since the protruding ring 18 is located between the slits 14, it will also be expanded by the resilient bladder 16. As a result, the protruding ring 18 and the indentation 44 will mate with one another to create a tight frictional fit therebetween. Note, that even when the bladder is not expanded radially, the protruding ring 18 acts as an initial securing means for holding the tool adapter 30 onto the split collet 12.

Figure 2:
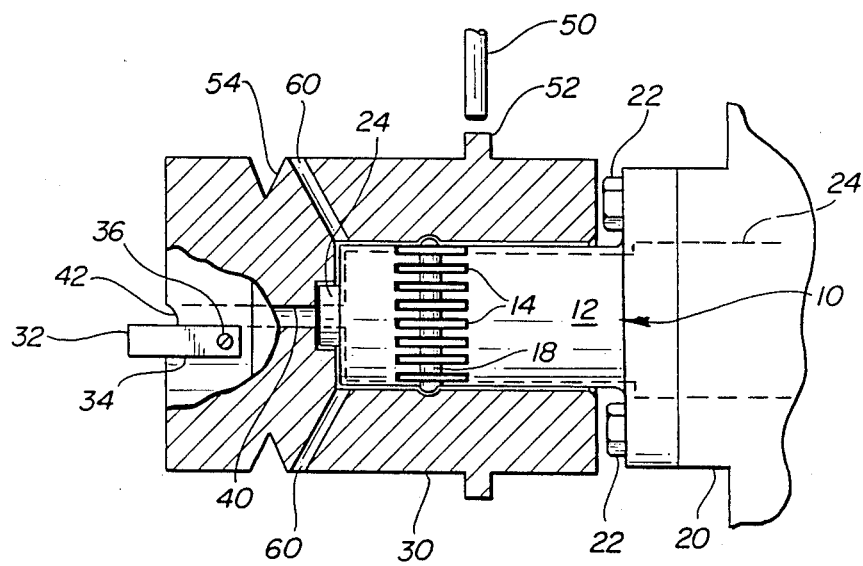
FIG. 2 is a side view, partially in section, of the tool holder of FIG. 1 with the tool adapter attached thereto.

While the embodiment of the present invention shown in FIGS. 1-3 illustrates the protruding ring 18 located between the slits 14, it is contemplated by this invention that the ring 18 may be alternately located a spaced distance away from the slits 14. It is further contemplated by this invention that the split collet may include slits, in addition to or as substitutes for the ones illustrated in the embodiment of FIGS. 1-3, having various other shapes and locations.

The spindle 20, upon which the split collet 12 is attached, has an opening 24 therein for supplying pressurized coolant fluid to the cutting insert 32 via the opening 42 on the tool adapter 30. The spindle 20 is supplied with the pressurized fluid from the machining apparatus. The coolant fluid acts to cool the cutting insert 32 and the workpiece (not shown) being worked. The pressurized coolant fluid travels out of the opening 24, into the bladder 16 located in the split collet 12 and into the second recess 40 of the tool adapter 30. After the coolant fluid travels into the second recess 40, it is discharged out from the opening 42 into the working area of the cutting insert 32. The resilient bladder 16 extends a small distance out from a nose portion 24 of the split collet 12, as shown in FIG. 1, in order to make a seal at the interface between the second recess 40 and the nose portion 24 of the split collet 12 when the tool adapter 30 and the tool holder 10 are engaged. This seal insures that none of the coolant fluid gets diverted into the first recess 38 of the tool adapter 30.

Since the coolant fluid is delivered under pressure from the drive spindle 20, it serves to radially expand the resilient bladder 16 as it travels into and through the bladder 16. As the bladder 16 expands outwardly in a radial direction, it will cause the split collet 12 to also expand radially, as discussed above, thereby securing the tool adapter 30 onto the split collet 12, and hence the spindle 20.

Optionally, a proximity indicator switch 50 may be employed to sense when the tool adapter 30 is engaged with the tool holder 10. The proximity switch 50 senses engagement between the tool adapter 30 and the tool holder 10 by sensing a metal annular ring 52 located on the outer surface of the tool adapter 30. The proximity switch 50 is fixed in a position above the tool holder 10 so that when the tool adapter 30 is engaged on the tool holder 10, the annular ring 52 will be directly across from the switch 50, as shown in FIG. 2. When this position is obtained, the switch will indicate that the tool adapter 30 is located on the tool holder 10. The signal from the switch 50 may actuate an indicator on the machining apparatus or it may be employed by a known automatic controller which may use the signal while controlling the operation of the machining apparatus.

The tool adapter 30 may further comprise any number of debris escape holes 60, extending from the back end 39 of the first recess 38 out to the outer surface of the tool adapter 30. The debris escape holes 60 permit any dirt or debris which might be in the tool adapter 30 prior to being engaged with the tool holder 10 to exit from the tool adapter 30 after being pushed to the back end 39 of the first recess 38 by the tool holder 10.

The tool adapter 30 may also include an annular notch 54 in its outer surface. A known tool changer (not shown) may be engaged in the notch 54 in order to remove the tool adapter 30 from the tool holder 10.

In practice, in order to secure the tool adapter 30 onto the drive spindle 20, the tool holder 10 is first inserted into the first recess 38 of the tool adapter 30. When this occurs, the protruding ring 18 on the split collet 12 will engage with the indentation 44 in the first recess 38 of the tool adapter 30, thereby initially locking the tool adapter 30 onto the tool holder 10.

As coolant is supplied from the spindle 20 to the opening 42 on the tool adapter 30, the coolant travels under pressure into and through the resilient bladder 16. From the bladder 16, the coolant travels into second recess 40 and out opening 42 to cool the cutting insert 32 and the workpiece being worked. As the coolant fluid flows under pressure into and through the bladder 16, the fluid expands the bladder 16 radially outwardly. As the bladder 16 expands, it also expands the split collet 12 radially outwardly, thereby permitting the split collet 12 to securely hold the tool adapter 30 onto the spindle 20 during machining operations. Thus, by expanding the split collet 12, the bladder 16 enables the coolant fluid to assist mechanical and centrifugal forces associated with the split collet 12 to hold the tool adapter 30 onto the spindle 20.

The fast tool change holder of the present invention permits rapid and simple tool changes by an operator without the need for manual removal of bolts and without the need for complex hydraulic piston arrangements. Changing a tool requires only a simple removal of the tool adapter by overcoming the friction fit of the adapter over the split collet. During operation, the pressure of coolant fluid expanding the resilient bladder and split collet provides a secure fit of the adapter to the tool holder.

Having described the fast tool holder of the present invention and its operation in detail and by reference to preferred embodiments thereof, it will be apparent that modifications and variations are possible without departing from the scope of the invention. For example, it is contemplated that additional protruding rings may be added onto the tool holder. Alternatively, the protruding ring shown may be replaced by one or a plurality of other protruding elements, such as dimples. Further, it is contemplated that the tool holder may be formed without the ring shown or any other protruding elements.

What is claimed is:

1. A fast tool change holder for holding a tool adapter onto a drive spindle by utilizing coolant fluid supplied from the drive spindle to a tool on the tool adapter comprising:

an expandable collet means connected to the drive spindle for holding the tool adapter onto said drive spindle after being inserted and expanded within said tool adapter; and means associated with said collet means for expanding said collet means radially outwardly utilizing the pressure of the coolant fluid supplied from said spindle to the tool on said tool adapter, said expanding means permitting said coolant fluid to assist mechanical and centrifugal forces associated with said collet means to hold said tool adapter onto said spindle.

2. A fast tool change holder as set forth in claim 1, wherein said expanding means comprises a bladder made from a resilient material.

3. A fast tool change holder as set forth in claim 2, wherein said resilient material comprises a polymeric material.

4. A fast tool change holder as set forth in claim 3, wherein said polymeric material comprises rubber.

5. A fast tool change holder as set forth in claim 2, wherein said tool adapter includes a first inner recess for receiving said expandable collet means therein and a second inner recess connected with said first recess for delivering the coolant fluid supplied from said drive spindle to the tool on said tool adapter, said coolant fluid traveling from said drive spindle, through said bladder and into said second inner recess for delivery to said tool; and said bladder extending beyond said expandable collet means to create a seal at the interface between said collet means and said tool adapter to prevent said coolant fluid from being diverted into said first inner recess of said tool adapter as said coolant fluid travels through said bladder and into said second recess.

6. A fast tool change holder as set forth in claim 1, wherein said expandable collet means comprises a split collet.

7. A fast tool change holder as set forth in claim 1, further comprising means for sensing when said expandable collet means is located within said tool adapter.

8. A fast tool change holder as set forth in claim 1, wherein said tool adapter includes an indentation therein; and said expandable collet means includes means for engaging said indentation for retaining said tool adapter onto said spindle.

9. A fast tool change holder as set forth in claim 8, wherein said engaging means comprises a protruding ring extending outwardly from said collet means.

10. A fast tool change holder as set forth in claim 1, wherein said tool adapter includes means for permitting debris contained within said tool adapter to escape from said adapter.

11. A fast tool change holder as set forth in claim 1, further comprising means for attaching said expandable collet means to said spindle.

12. A fast tool change holder as set forth in claim 1, wherein said expandable collet means is formed as an integral part of said spindle.

13. A clamping system for clamping a tool adapter onto a spindle comprising:

an expandable collet means connected to the spindle for holding the tool adapter onto said spindle after being inserted and expanded within said tool adapter; and means located within said collet means for expanding said collet means radially outwardly utilizing the pressure of coolant fluid supplied from said spindle, said expanding means permitting said coolant fluid to assist mechanical and centrifugal forces associated with said collet means to hold said tool adapter onto said spindle.

14. A clamping system as set forth in claim 13, wherein said means for expanding said collet means comprises a bladder made from a resilient material.

15. A clamping system as set forth in claim 14, wherein said resilient material comprises a polymeric material.

16. A clamping system as set forth in claim 15, wherein said polymeric material comprises rubber.

17. A clamping system as set forth in claim 14, wherein said tool adapter includes a first inner recess for receiving said expandable collet means therein and a second inner recess connected with said first recess for delivering the coolant fluid supplied from said drive spindle to the tool on said tool adapter, said coolant fluid traveling from said drive spindle, through said bladder and into said second inner recess for delivery to said tool; and said bladder extending beyond said expandable collet means to create a seal at the interface between said collet means and said tool adapter to prevent said coolant fluid from being diverted into said first inner recess of said tool adapter as said coolant fluid travels through said bladder and into said second recess.

18. A clamping system as set forth in claim 13, wherein said expandable collet means comprises a split collet.

19. A clamping system as set forth in claim 13, further comprising means for sensing when said expandable collet means is located within said tool adapter.

20. A clamping system as set forth in claim 13, wherein said tool adapter includes an indentation therein; and said expandable collet means includes retaining means engagable with said indentation for retaining said tool adapter on said spindle.

21. A clamping system as set forth in claim 20, wherein said retaining means comprises a protruding ring extending from said collet means.

22. A clamping system as set forth in claim 13, wherein said tool adapter includes means for permitting debris contained within said tool adapter to escape therefrom.

23. A clamping system as set forth in claim 13, further comprising means for attaching said expandable collet means to said spindle.

24. A fast tool change holder as set forth in claim 13, wherein said expandable collet means is formed as an integral part of said spindle.

* * * * *